US005946604A

United States Patent [19]

Bailey

[11] Patent Number: 5,946,604

[45] Date of Patent: Aug. 31, 1999

[54] MIDI PORT SOUND TRANSMISSION AND METHOD THEREFOR

[75] Inventor: James Lee Bailey, Provo, Utah

[73] Assignee: 1-O-X Corporation, Shreveport, La.

[21] Appl. No.: 08/814,605

[22] Filed: Mar. 10, 1997

Related U.S. Application Data

[63] Continuation of application No. 08/344,849, Nov. 25, 1994, abandoned.

[51] Int. Cl.[6] ........ H04B 7/00

[52] U.S. Cl. ........ 455/42; 455/66; 361/686; 84/645

[58] Field of Search ........ 455/42, 66, 74, 455/110, 205, 90, 575, 95, 41; 381/118, 61, 25; 364/188, 708.1, 710.12, 705.05; 348/738, 734; 361/684, 686; 84/645; 375/222, 377

[56] References Cited

U.S. PATENT DOCUMENTS

| | | | |
|---|---|---|---|
| 4,021,737 | 5/1977 | Trask | 455/42 |
| 4,543,450 | 9/1985 | Brandt | 375/222 |
| 4,845,751 | 7/1989 | Schwab | 381/25 |
| 5,319,716 | 6/1994 | McGreevy | 455/66 |
| 5,393,926 | 2/1995 | Johnson | 84/645 |

FOREIGN PATENT DOCUMENTS

| | | | |
|---|---|---|---|
| 0260325 | 10/1988 | Japan | 455/42 |
| 2121649 | 12/1983 | United Kingdom | 455/42 |

OTHER PUBLICATIONS

User Reference Manual, "Sound Blaster", 1989–1992, pp. 1–3 to 1–13, pp. 11–3 to 11–7.

*Primary Examiner*—Nguyen Vo
*Attorney, Agent, or Firm*—Harry M. Weiss; Harry M. Weiss & Associates, P.C.

[57] ABSTRACT

A sound card of a personal computer provides an audio signal that modulates a carrier of an FM transmitter. Radiation from the transmitter is received by an FM receiver.

5 Claims, 1 Drawing Sheet

MIDI PORT SOUND TRANSMISSION AND METHOD THEREFOR

This is a continuation of application Ser. No. 08/344,849 filed on Nov. 25, 1994, now abandoned.

BACKGROUND OF THE INVENTION

1. Field of Invention

This invention is in the field of high fidelity sound reproduction and methods therefore and, more particularly, is a system for transmitting audio signals from a sound card of a personal computer to an apparatus for producing high fidelity sound and method therefor.

2. Description of the Prior Art

Recently, there has been an epochal shift in the use of personal computers. The epochal shift is manifested by more personal computers being sold in the United States for home use than for business use. In other countries, such as Taiwan and Korea, about 25% of personal computers sold are for home use. In other words, the epochal shift is a worldwide phenomenon.

The reason for the epochal shift is that a personal computer often includes such features as a television, an answering machine, a radio, video and audio recording equipment, a facsimile machine and even an alarm clock. Accordingly, the personal computer has many features that militate in favor of its becoming a key element of a home entertainment center.

In the home entertainment center, the personal computer may include a sound card that processes and stores a digital signal representation of sound, such as music. Typically, an analog signal representation of the sound is provided to an analog to digital converter of the sound card. The digital signal representation is provided by the analog to digital converter.

A user of the personal computer may cause the digital signal representation to be provided to a digital to analog converter. In response to the digital signal representation, the digital to analog converter provides an analog signal representation of the sound to an audio output jack of the sound card.

Usually, the sound card is connected to a pair of speakers in the computer, whereby the sound is reproduced. However, the computer speakers are typically small and of poor construction. Thus, the quality of sound reproduction is poor and may be partially unintelligible.

The sound reproduction may be improved by connecting the output jack via wires to an amplifier that drives loudspeakers of improved quality. However, the wires are often cumbersome and inconvenient.

Thus, there exists a need to provide a wireless link between the sound card and the amplifier that drives the loudspeakers. Heretofore, there has not been a wireless link that utilizes the audio from the sound card.

SUMMARY OF THE INVENTION

An object of the present invention is to provide apparatus for high fidelity reproduction of sound represented by an analog signal provided at an audio output of a sound card of a personal computer and method therefor.

Another object of the present invention is to provide a wireless link between the audio output of a sound card of a personal computer and a sound reproduction apparatus and method therefor.

Another object of the present invention is to provide a wireless link between the audio output of a sound card of a personal computer and a sound reproduction apparatus where power for the wireless link is provided from a midi port of a sound card and method therefor.

BRIEF DESCRIPTION OF THE PREFERRED EMBODIMENT

According to a first aspect of the present invention, an analog signal provided at an audio output of a sound card of a personal computer frequency modulates a carrier signal of an FM transmitter. According to a second aspect of the present invention, power for the transmitter is provided from a midi port of the sound card.

The present invention provides an economical way of providing a wireless link between a sound card of a personal computer and an apparatus for high fidelity reproduction of sound, where power for the wireless link is provided from a midi port of the sound card.

Other objects, features, and advantages of the invention will be apparent from the following description of the preferred embodiment as illustrated in the accompanying drawing.

DESCRIPTION OF THE PREFERRED EMBODIMENT

Figure 1:
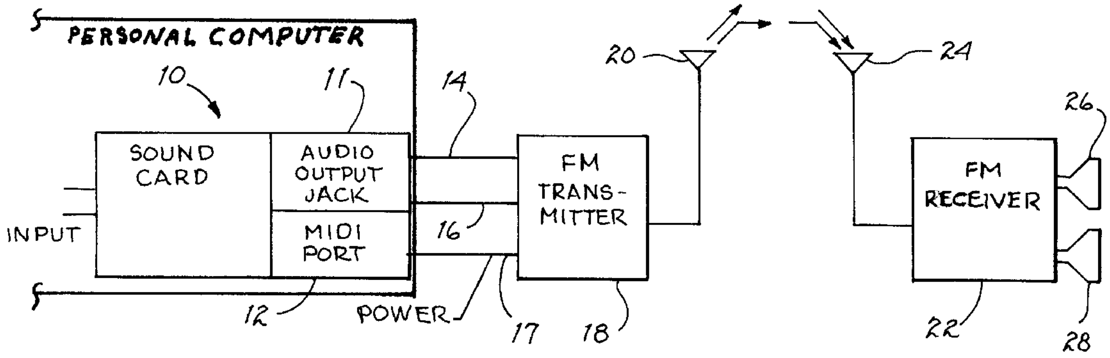
FIG. 1 is a block diagram of the preferred embodiment of the present invention.
Figure 2:
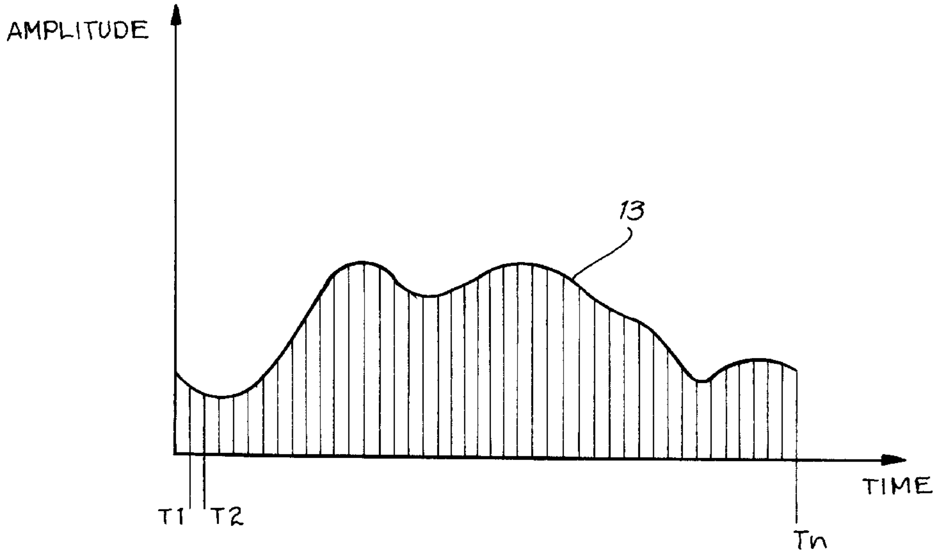
FIG. 2 is a waveform of an analog signal representation of sound that is provided to an input of a sound card in the embodiment of FIG. 1.

As shown in FIGS. 1 and 2, a sound card 10 (FIG. 1) of a personal computer has an input where analog stereophonic speaker signals representative of sound are applied. A signal representation of a left speaker analog signal has a waveform 13 (FIG. 2). Typically, the sound is music.

Within sound card 10, an analog to digital converter serially samples the left speaker signal at equally spaced sample times denoted as $T_1, T_2 \ldots T_n$. At each sample time, the left speaker analog signal is converted to a digital signal representation and is stored. The right speaker analog signal is sampled and stored in a similar manner, whereby a digital signal representation of the sound is stored.

In response to a command issued via a keyboard (not shown) of the personal computer, digital to analog converters of the sound card serially converts the digital signal representations of the samples to a left speaker analog output signal and a right speaker analog output signal. The left and right speaker output signals are provided at an output jack 11 of sound card 10. Sound cards of the type described hereinbefore are well known to those skilled in the art.

An audio output jack 11 of sound card 10 is connected through signal lines 14, 16 to an FM transmitter 18, whereby the left and right speaker output signals are provided to transmitter 18. Additionally, a midi port 12 of sound card 10 is connected through a power line 17 to transmitter 18. In this embodiment, midi port 12 provides five volts DC with a power capability of four watts to transmitter 18.

Within FM transmitter 18, the speaker output signals modulate a carrier signal in accordance with well known practices used for FM transmission. A modulated carrier signal is radiated from an antenna 20 of transmitter 18. Preferably, the radiation is at a frequency, unused by commercial broadcasters, in a range of 88 megahertz to 108 megahertz.

Radiation from antenna 20 is received by an FM receiver 22 via an antenna 24. Receiver 22 substantially replicates (within a scale factor) the speaker output signals. Additionally, receiver 22 amplifies the replicated speaker output signals. The replicated and amplified left and right hand speaker signals are provided to speakers 26, 28, respectively, whereby the sound is stereophonicly reproduced. Therefore, transmitter 18 provides a wireless link between midi port 12 and receiver 22.

While the invention has been particularly shown and described with reference to a preferred embodiment thereof, it will be understood by those skilled in the art that changes in form and detail may be made therein without departing from the spirit and scope of the invention.

I claim:

1. An apparatus for reproducing sound, comprising:

a personal computer that includes a sound card installed therein; and transmitter means coupled to said sound card for radiating a carrier signal that is modulated by an audio signal provided by said sound card, said carrier signal being received by a home entertainment system receiver for the high fidelity reproduction of said audio signal from said personal computer, said sound card including a midi port that has only a single, direct connection to said transmitter means, said single, direct connection from said midi port providing a maximum of 5 VDC power to said transmitter means.

2. The apparatus of claim 1 wherein said carrier signal is frequency modulated.

3. In the method of providing a wireless link between a sound card of a personal computer and a high fidelity home entertainment system receiver, the steps of:

modulating a carrier signal provided by a transmitter with an audio signal provided by said sound card;

radiating said modulated carrier signal;

receiving said modulated carrier signal and reproducing said personal computer's sound with said hi fidelity home entertainment system receiver; and providing a maximum of 5 VDC power to said transmitter from a single, direct connection from a midi port of said sound card.

4. In the method of claim 3 wherein said step of modulating includes frequency modulating.

5. In the method of claim 3 wherein said radiating is at a frequency in a range of 88 megahertz to 108 megahertz.

* * * * *